US008447555B2

(12) United States Patent
Tabelander et al.

(10) Patent No.: US 8,447,555 B2
(45) Date of Patent: *May 21, 2013

(54) METHOD FOR INCREASING THE AVAILABILITY OF DISPLACEMENT/POSITION MEASURING SYSTEMS ON THE BASIS OF POTENTIOMETERS WITH A SLIDER TAP

(75) Inventors: Stefan Tabelander, Herford (DE); Thomas Kleegrewe, Minden (DE); Andreas Wahlmann, Meerbeck (DE)

(73) Assignee: ABB Technology AG, Zurich (CH)

( * ) Notice: Subject to any disclaimer, the term of this patent is extended or adjusted under 35 U.S.C. 154(b) by 196 days.

This patent is subject to a terminal disclaimer.

(21) Appl. No.: 12/849,568

(22) Filed: Aug. 3, 2010

(65) Prior Publication Data

US 2011/0035173 A1 Feb. 10, 2011

(30) Foreign Application Priority Data

Aug. 10, 2009 (DE) .......................... 10 2009 036 875

(51) Int. Cl.
*G01C 25/00* (2006.01)

(52) U.S. Cl.
USPC .............................. 702/116; 702/183; 702/94

(58) Field of Classification Search ................... 702/116, 702/183, 185, 189
See application file for complete search history.

(56) References Cited

U.S. PATENT DOCUMENTS

| 5,146,886 | A | | 9/1992 | Männle et al. |
| 5,224,453 | A | * | 7/1993 | Bederna et al. ............... 123/479 |
| 6,181,141 | B1 | | 1/2001 | Juntunen et al. |
| 6,446,522 | B1 | * | 9/2002 | Warren et al. ................... 74/335 |
| 7,369,969 | B2 | * | 5/2008 | Scherr ........................... 702/189 |
| 7,535,333 | B2 | | 5/2009 | Flentge et al. |
| 2008/0257428 | A1 | | 10/2008 | Scholz et al. |

FOREIGN PATENT DOCUMENTS

| DE | 40 18 922 A1 | 1/1991 |
| DE | 41 41 739 A1 | 6/1993 |
| DE | 42 39 635 A1 | 5/1994 |
| DE | 600 16 984 T2 | 12/2005 |
| DE | 10 2004 035 945 B3 | 4/2006 |
| DE | 10 2007 019 045 A1 | 11/2008 |
| EP | 1 022 570 A2 | 7/2000 |

(Continued)

OTHER PUBLICATIONS

German Examination Resort for DE 10 2009 036 875.2 dated Apr. 16, 2010.

(Continued)

*Primary Examiner* — Andrew Schechter
*Assistant Examiner* — Ivan Rabovianski
(74) *Attorney, Agent, or Firm* — Buchanan Ingersoll & Rooney PC

(57) ABSTRACT

The disclosure relates to a method for increasing the availability of displacement/position measuring systems on the basis of potentiometers with a slider tap in a closed control loop, the controller of which is formed by a microcontroller which is supplied with the position of the slider via an analog/digital converter. At least part of the sensor range of the potentiometer is scanned on request by presetting a sequence of manipulated variables and an available control loop variable which represents the position value at a high sampling rate outside process tasks is recorded, to determine the exact position of a defective slider position of the potentiometer by evaluating the variable. The reference variable of the control loop is overloaded in a defined manner within the process task such that the defective slider position is passed over during the displacement/position measurement and an intact slider position is reached.

18 Claims, 3 Drawing Sheets

FOREIGN PATENT DOCUMENTS

GB     2 272 771 A    5/1994

OTHER PUBLICATIONS http://de.wikipedia.org/wiki/Regelkreis (English language version also attached) (88 total pages).

"Der kompakte, intelligente Stellungsregler" [The compact, intelligent positioner] (ABB Automation Products GmbH, document No. 50/18-19 DE RevA: Jun. 2005 edition) (English language version also attached) (4 total pages).

* cited by examiner

The standard control loop [edit]

In control engineering, five parts which are illustrated in the block diagram are distinguished in the control loop:

1. $F_R$ = Control element/controller
2. $F_{St}$ = Actuating element
3. $F_S$ = Control path
4. $F_Z$ = Interference variable transmission element
5. $F_M$ = Measuring element The following variables result inside the control loop:
- w Reference variable
- e Control error/control difference
- y_r Auxiliary manipulated variable/controller output variable
- y Manipulated value/manipulated variable
- z Interference variable
- x Output/controlled variable
- r lFeedback variable

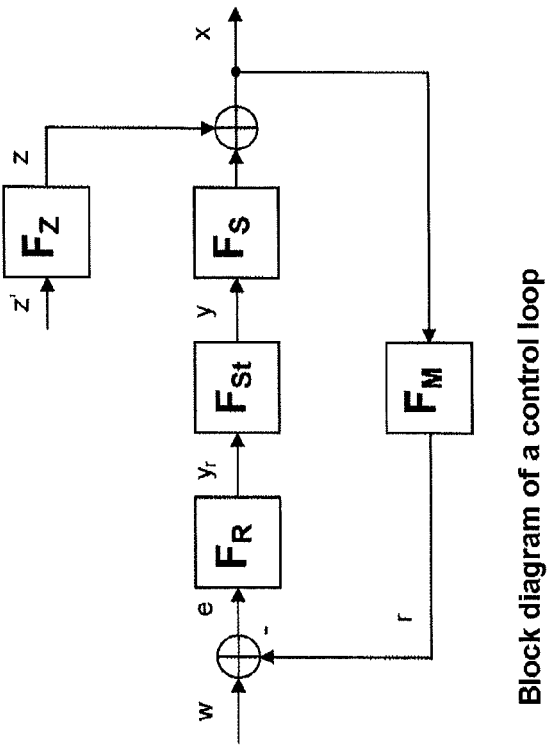

Block diagram of a control loop

Figure 1
(Prior art)

METHOD FOR INCREASING THE AVAILABILITY OF DISPLACEMENT/POSITION MEASURING SYSTEMS ON THE BASIS OF POTENTIOMETERS WITH A SLIDER TAP

RELATED APPLICATION

This application claims priority under 35 U.S.C. §119 to German Patent Application No. 10 2009 036 875.2 filed in Germany on Aug. 10, 2009, the entire content of which is hereby incorporated by reference in its entirety.

FIELD

The disclosure relates to a method for increasing the availability of displacement/position measuring systems on the basis of potentiometers with a slider tap.

BACKGROUND INFORMATION

Such position measuring systems can be used, for example, in electropneumatic position controllers and electrical variable-speed drives to return the actual value and can thus be part of a closed control loop. The sudden failure of the position measuring system can result in the immediate failure of the device functionality.

The structure and method of operation of a closed control loop are known and are described, for example, at http://de.wikipedia.org/wiki/Regelkreis, extracts of which are shown in FIG. 1.

The product brochure "Der kompakte, intelligente Stellungsregler" (The compact, intelligent position controller) (ABB Automation Products GmbH, print number: 50/18-19 DE RevA; June 2005 edition, discloses an electronic position controller of the type mentioned at the outset for a pneumatic actuator.

In such a position controller and with reference to FIG. 1, the reference variable w can be preset via a desired value channel formed, in particular, by an analog 4.20 mA input or a field bus such as HART, Profibus PA, Foundation field bus, etc.

In this arrangement, the control path $F_S$ forms the pneumatic actuator/variable-speed drive to be positioned. In the known position controller, the control element $F_R$, the actuating element $F_{St}$ and the measuring element $F_M$ can be constructed in a housing. In the known actuator, the control element $F_R$ can be in the form of a microcontroller-supported system. In the known actuator, the measuring element $F_M$ can be in the form of a potentiometer with a slider tap which measures the set position x of the drive to be controlled. The actuating element $F_{St}$ can typically be in the form of an IP module in an electropneumatic position controller.

In this case, the potentiometer can be supplied with a constant and known reference voltage, and the position can then be detected in an analog/digital converter using the displacement-proportional voltage tap. In terms of circuitry, this arrangement can thus be the form of a voltage divider with a position-dependent voltage tap. The feedback variable r can be present in digital form in the analog/digital converter. The voltage tap can be effected with the highest possible impedance of the measuring circuit in order to minimize measurement errors.

The microcontroller-supported system forms a controller output variable $y_r$ from the control difference e with the aid of a suitable control algorithm in the controller $F_R$, which output variable can be used to drive the IP module via a suitable electronic circuit.

In some special applications, the position sensor belonging to the position measuring system as well as other associated components are not arranged in the same housing. In this case, the position measuring system can be arranged outside the positioner as a remote displacement sensor.

Potentiometers with a slider tap have the property that they are resistant to vibrations only to a limited extent. In addition, the slider and the resistance track can wear away as a result of electrical erosion after a finite number of movements until they are defective.

In the case of a frequently occurring error pattern, the resistance track can be damaged by abrasion and/or electrical erosion as a result of a slider which cyclically oscillates around a constantly recurring point because the position controller corrects only small control errors. This occurs, in particular, in feedback systems, as can be found in electropneumatic position controllers or electrical variable-speed drives, when they operate with a constant or virtually constant desired value for a long period of time. A defect can be fostered by poor controllability of the control path because the latter tends toward the oscillation, the period of time for which control is effected at a constant or virtually constant desired value, because the associated sensor/potentiometer range is then used for a long time, and the occurrence of a defect can increase as the frequency increases.

Only a range of a few angular degrees is often affected. In this case, the slider can work its way ever further into the material of the resistance track until it finally can no longer make contact. The potentiometer is worn at this point and therefore cannot continue to be used for measurement. More than one point of the sensor may be defective inside an operating range.

In addition, chemical influences have a negative effect on the service line of slider potentiometers. A defect of the potentiometer can result in the failure of the displacement/position measurement.

The failure of the displacement/position measuring system can result in the failure of the device function, as a result of which the position controller carries out a positioning reaction which is predetermined for the controller and in which the controller remains until the cause of the failure has been rectified. Positioning reactions which can be carried out without a displacement/position measuring system can be preset for this purpose. Depending on the respective application, provision may be made to ventilate or vent the drive, so-called "fail safe", or to block the drive in the current position, so called "fail freeze."

Because failure may not be predicted and is also not diagnosed at regular service intervals, such failure can result in unplanned stopping of the process which is often associated with high costs for the user.

In the attempt to increase the availability of the sensor, contactless measuring methods, as are disclosed in DE 42 39 635 A1 and DE 10 2007 019 045 A1 for example, have been investigated. However, it has been found that these methods, with a higher degree of technical complexity than potentiometer-based measurement, also have such a high energy consumption that they are rendered unusable for applications in devices which are supplied from a current loop whose power is limited.

SUMMARY

A method is disclosed for increasing availability of a displacement/position measuring systems based on a potentiometer with a slider tap in a closed control loop, the controller of which is formed by a microcontroller. The method includes supplying the microcontroller with a position of a slider via an analog/digital converter, scanning at least part of a sensor range of the potentiometer on request by presetting a sequence of manipulated variables, recording an available control loop variable which represents the position value at a high sampling rate outside process tasks, determining a position of a defective slider position of the potentiometer by evaluating the control loop variable by way of an associated manipulated variable, overloading a reference variable of the control loop in a defined manner within the process task such that the defective slider position is avoided during a displacement/position measurement and reaching an intact slider position.

BRIEF DESCRIPTION OF THE DRAWINGS

The disclosure is explained in more detail below using an exemplary embodiments. In the drawings:

FIG. 1 shows a basic illustration of a known control loop;

DETAILED DESCRIPTION

Figure 2:
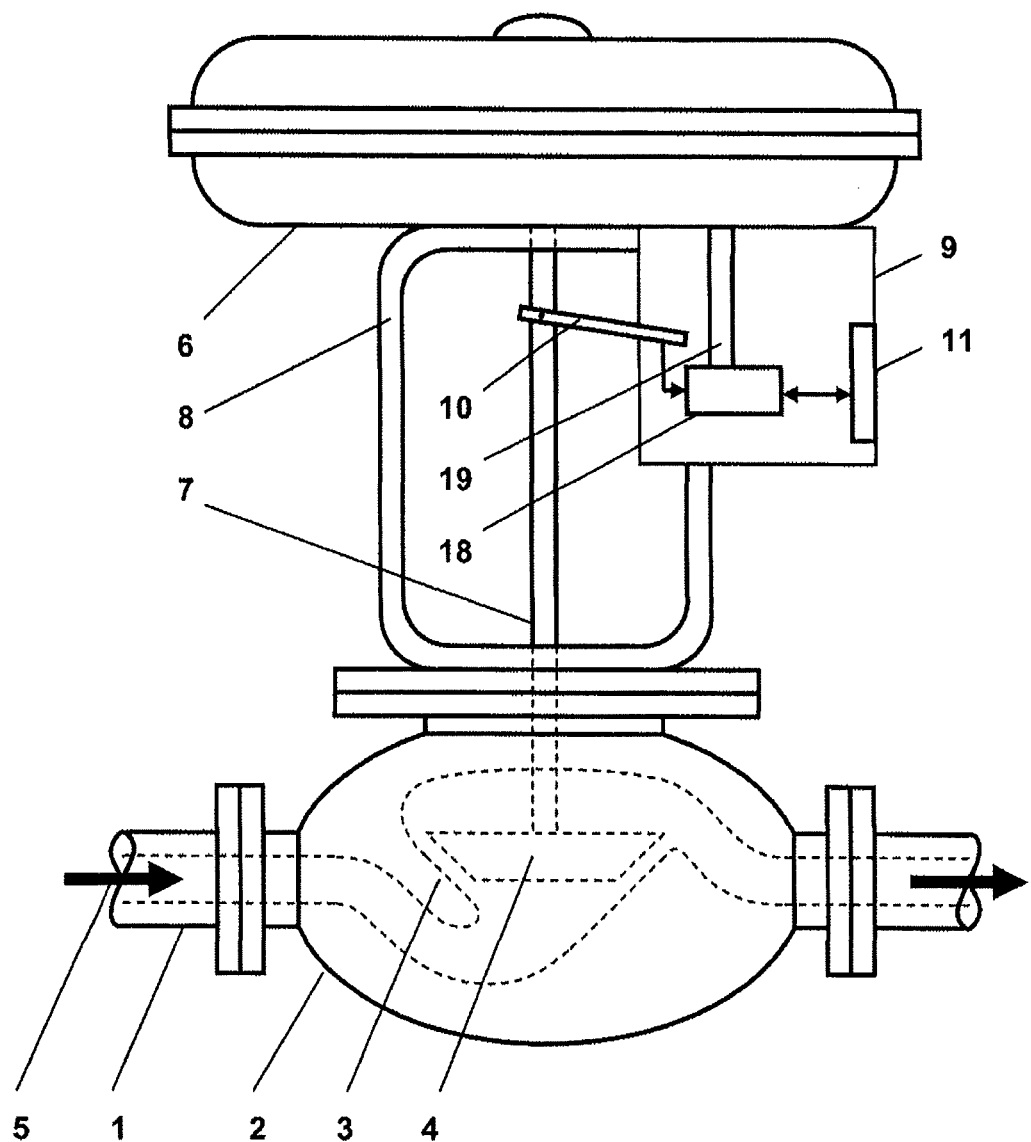
FIG. 2 shows a basic illustration of an exemplary embodiment of an actuator having a potentiometer-based device for determining the position.

The features of the disclosure can increase the availability of a potentiometer-based displacement/position measuring system whilst retaining the measurement principle.

An exemplary embodiment according to the disclosure can be based on a displacement/position measuring system on the basis of potentiometers with a slider tap in a closed control loop, the controller of which is formed by a microcontroller which is supplied with the position of the slider via an analog/digital converter. In such a potentiometer a "buried" slider does not interrupt the resistance track but rather only the tap is no longer possible at this singular, eroded position.

According to the disclosure, at least part of the sensor range of the potentiometer can be scanned on request by presetting a sequence of manipulated variables and an available control loop variable, which represents the position value, can be recorded at a high sampling rate outside process tasks. The exact position of a defective slider position of the potentiometer can be determined by evaluating the control loop variable by way of the associated manipulated variable. The reference variable of the control loop can be overloaded in a defined manner in the range of the defective position within the process task such that the defective slider position can be avoided during the displacement/position measurement and an intact slider position can be reached.

In this case, the actuating element can be fail-positioned in a defined manner with respect to the desired value preset during intended use. During positioning, the defective slider position can be only dynamically passed over during the positioning operation but is no longer statically approached. In addition, a superordinate device can be warned of the detection of a defective slider position.

In favor of greater availability, a temporary reduction in the positioning accuracy during continuous controlled operation can be accepted. However, the total failure of the device function can be avoided in this case.

In the case of a displacement/position measuring system with an analog/digital converter, a defective slider position can be detected as an invalid numerical value of the digital output in the operating range of the potentiometer. When starting up the device, the entire operating range within the measurement range of the potentiometer can be scanned at least once. The limits of the operating range in the respective application can be then known. At a defective slider position, the partial voltage tapped off across the slider is outside the limits of the operating range determined during start-up.

According to another exemplary embodiment of the disclosure, in order to determine the location of a defective slider position, at least one subrange of the sensor range can continuously run through at a speed which can be as constant, slow and uniform as possible and, if a respective defective sensor position is detected, the valid value respectively closest to the position before and after the defective position is stored.

According to another exemplary embodiment of the disclosure, a defective slider position which has already been determined can be deliberately approached and its environment can be scanned with a small step size. As a result, the location and dimension of the defective slider position can be determined precisely and that range of the displacement/position measuring system which needs to be avoided can be kept as small as possible.

According to another exemplary embodiment of the disclosure, a defective slider position can be detected by unexpected deviations, such as severe discontinuities, sudden changes or severe changes, between a plurality of measured values in comparison with an expected characteristic curve profile of the partial voltage across the slider of the potentiometer. The transfer characteristic of a potentiometer can typically be linear. Deviations from the expected linearity can be detected in a simple manner.

According to another exemplary embodiment of the disclosure, the deviation from the expected profile can specifically be detected by comparing the actual profile with a reference which is stored in a nonvolatile manner.

According to an exemplary embodiment of the disclosure, the location of a defective slider position can be determined by assigning the current reference variable to the feedback variable.

According to another exemplary embodiment of the disclosure, the sensor range can be at least partially subdivided into segments of a known size and, when a defective sensor position is determined, at least that segment in which the defect is present can be excluded from control such that arbitrary desired value presets do not give rise to any reference variables which allow the system to permanently operate in that segment of the sensor which has been detected as being defective. Specifically, the affected segment can be excluded in that manner in this case, sporadic operation in the defective range not resulting in failure of the system.

In another exemplary embodiment of the disclosure, the reference variable as the result of a desired value preset, which would be caused by operation in a range excluded as being defective, can be rounded up or down in such a manner that the controller operates with the smallest possible control error at the upper or lower limit value with a sufficient distance from the excluded range.

According to another exemplary embodiment of the disclosure, a diagnostic message can be generated in response to the detection of a range affected by at least one defect and can be transmitted to a superordinate device which includes information relating to the location of the defective range, the size and the number of defective positions.

According to another exemplary embodiment of the disclosure, the size of at least one coherently excluded range can be used as a criterion for the failure of the entire measuring system.

According to an exemplary embodiment of the disclosure, the number of ranges excluded in the measurement range used can be used as a criterion for the failure of the entire measuring system.

According to an exemplary embodiment of the disclosure, the absolute size of all excluded ranges can be used as a criterion for the failure of the entire measuring system.

FIG. 1 shows the basic structure of a control loop which emerges from the prior art, which structure has already been explained in the introductory part of the description.

In FIG. 2, a process valve 2 is installed, as an actuating element, in a pipeline 1, which is indicated in fragmentary form, of a process installation which is not illustrated in any more detail. In its interior, the process valve 2 has a closing body 4 which interacts with a valve seat 3 and can control the amount of process medium 5 passing through. The closing body 4 can be linearly operated, via a lifting rod 7, by a pneumatic actuator 6. The actuator 6 is connected to the process valve 2 via a yoke 8. A digital position controller 9 is fitted to the yoke 8. The travel of the lifting rod 7 can be reported to the position controller 9 via a position sensor 10. The travel detected can be compared with the desired value, which can be supplied via a communication interface 11, in control electronics 18, and the actuator 6 can be driven on the basis of the control error determined. The control electronics 18 of the position controller 9 operate an I/P converter for converting an electrical control error into an adequate control pressure. The I/P converter of the position controller 9 can be connected to the actuator 6 via a pressure medium supply 19.

The position sensor 10 can be connected to the axis of rotation of a potentiometer in the position controller 9 and has an eye in which a catch on the lifting rod 7 engages. This potentiometer can be part of the measuring element $F_M$ in the control loop according to FIG. 1 and, at the same time, in the extended control loop according to FIG. 3 which is explained below.

First, at least part of the sensor range of the potentiometer can be scanned on request by presetting a sequence of manipulated variables. An available feedback variable r, which represents the position value, can be recorded at a high sampling rate outside process tasks. The exact position of a defective slider position of the potentiometer can be determined by evaluating the feedback variable r by way of the associated manipulated variable y.

On the basis of a sufficiently known position of a defective slider position of the potentiometer, the reference variable w of the control loop can be overloaded in a defined manner in the range of the defective position within the process task such that the defective slider position can be avoided during the displacement/position measurement and an intact slider position can be reached.

Figure 3:
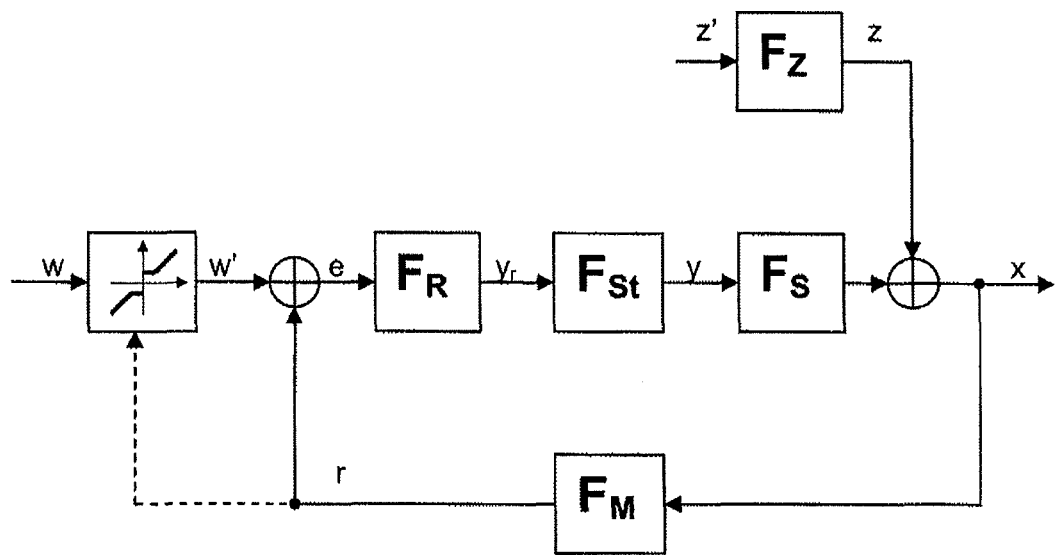
FIG. 3 shows a basic illustration of am exemplary embodiment of a control loop which has been extended according to the disclosure.

In this respect, FIG. 3 shows a basic illustration of a control loop which has been extended according to the disclosure. In this case, the functional chain starting with the control error e, via the controller $F_R$, the actuating element $F_{St}$, the control path $F_S$ and the measuring element $F_M$, to the feedback variable r corresponds to the known control loop according to FIG. 1.

Unlike the known control loop, the reference variable w can be overloaded with a modified reference variable w' which can be combined with the feedback variable r in a manner known per se to form the control error e. In this case, the modified reference variable w' can be formed by deliberately rounding the reference variable w up or down in such a manner that the system passes over or remains in front of the sensor range which has been detected as being defective and has been declared as such and which would be approached by the reference variable w without the overloading operation.

Figure 4:
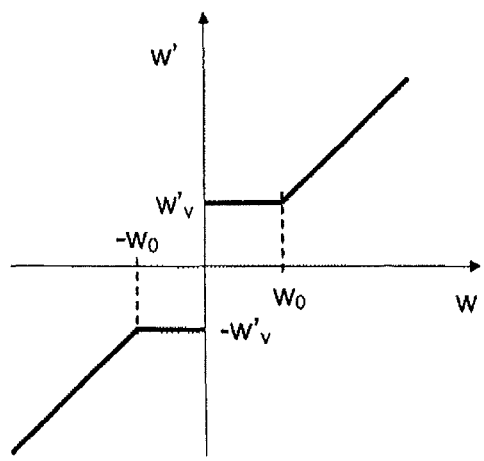
FIG. 4 shows an illustration of a characteristic curve.

A transfer characteristic from the reference variable w to the modified reference variable w' is illustrated in FIG. 4. For all values of the reference variable w outside the range $-w_0$ to $w_0$ which extends symmetrically around the coordinate origin, the modified reference variable w' is equal to the reference variable w. Within the range $-w_0$ to $w_0$, the modified reference variable w' can be formed by a positive preset value $w'_v$ for positive values of the reference variable w and can be formed by a negative preset value $-w'_v$ for negative values of the reference variable w. As a result, the range $-w_0$ to $w_0$ of the reference variable w can be removed from the range of values of the modified reference variable w'.

Based on the transfer characteristic according to FIG. 4, each defective slider position from the feedback variable r is respectively projected per se onto the coordinate origin of the transfer function of the reference variable w to w'. As soon as the actuator 6 approaches a defective slider position on account of its reference variable w and thus approximates the feedback variable r declared as being defective, the preset value $w'_v$ can be output as a modified reference variable w' for positive values of the reference variable w and the preset value $-w'_v$ can be output as a modified reference variable w' for negative values of the reference variable w upon entering the range $-w_0$ to $w_0$. Combining the modified reference variable w' with the feedback variable r provides a control difference e which is relevant to further control, avoids the defective slider position as an intended actual value and instead strives for a defined incorrect position of the process valve 2 at an intact slider position of the potentiometer away from the slider position which has been detected as being defective. As a result, the actuator 6 remains usable until the requested replacement of the potentiometer.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Pipeline
2 Process valve
3 Valve seat
4 Closing body
5 Process medium
6 Actuator
7 Valve rod
8 Yoke
9 Position controller
10 Position sensor
11 Communication interface
18 Control electronics
19 Pressure medium supply

What is claimed is:

1. A method for increasing availability of a displacement/position measuring system based on a potentiometer with a slider tap in a closed control loop, a controller of which is formed by a microcontroller, the method comprising:

supplying the microcontroller with a position of a slider via an analog/digital converter;

scanning at least part of a sensor range of the potentiometer on a request by presetting a sequence of manipulated variables;

recording an available control loop variable which represents the position value at a sampling rate outside process tasks of the closed control loop;

determining a position of a defective slider position of the potentiometer by evaluating the control loop variable by way of an associated manipulated variable;

overloading a reference variable of the control loop in a defined manner within a process task such that the defective slider position is avoided during a displacement/position measurement;

reaching an intact slider position;

at least partially subdividing the sensor range into segments of a known size and, when a defective sensor position is determined, at least that segment in which a defect is present is excluded from control within the process task; and rounding up or down the reference variable as a result of a desired value preset, which would be caused by operation in a range excluded as being defective, in such a manner that the controller operates with a reduced control error at an upper or lower limit value with a distance from an excluded range.

2. The method as claimed in claim 1, comprising:
continuously running at least one subrange of the sensor range through at a speed which is as constant, slow and uniform to determine a location of the defective slider position; and storing a valid value respectively closest to the position before and after the defective position when a respective defective sensor position is detected.

3. The method as claimed claim 2, comprising:
approaching the defective slider position which has already been determined; and
scanning an environment of the defective slider position.

4. The method as claimed in claim 2, comprising:
detecting the defective slider position as an invalid numerical value of a digital output in the sensor range of the potentiometer.

5. The method as claimed in claim 2, comprising:
detecting the defective slider position by unexpected deviations between a plurality of measured values in comparison with an expected characteristic curve profile of a partial voltage across the slider of the potentiometer.

6. The method as claimed claim 1, comprising:
approaching the defective slider position which has already been determined; and
scanning an environment of the defective slider position.

7. The method as claimed in claim 6, comprising:
detecting the defective slider position as an invalid numerical value of a digital output in the sensor range of the potentiometer.

8. The method as claimed in claim 6, comprising:
detecting the defective slider position by unexpected deviations between a plurality of measured values in comparison with an expected characteristic curve profile of a partial voltage across the slider of the potentiometer.

9. The method as claimed in claim 1, comprising:
detecting the defective slider position as an invalid numerical value of a digital output in the sensor range of the potentiometer.

10. The method as claimed in claim 9, comprising:
detecting the defective slider position by unexpected deviations between a plurality of measured values in comparison with an expected characteristic curve profile of a partial voltage across the slider of the potentiometer.

11. The method as claimed in claim 1, comprising:
detecting the defective slider position by unexpected deviations between a plurality of measured values in comparison with an expected characteristic curve profile of a partial voltage across the slider of the potentiometer.

12. The method as claimed in claim 11, comprising:
detecting a deviation from an expected profile by comparing an actual profile with a reference which is stored in a nonvolatile manner.

13. The method as claimed in claim 1, comprising:
determining the location of the defective slider position by assigning a current reference variable to a feedback variable.

14. The method as claimed in claim 1, comprising:
generating a diagnostic message in response to detection of a range affected by at least one defect and for transmission to a superordinate device.

15. The method as claimed in claim 1, comprising:
selecting a size of at least one coherently excluded range as a criterion for failure of an entire measuring system.

16. The method as claimed in claim 1, comprising:
selecting a number of ranges excluded in a measurement range as a criterion for failure of an entire measuring system.

17. The method as claimed in claim 1, comprising:
selecting an absolute size of all excluded ranges as a criterion for failure of an entire measuring system.

18. The method as claimed in claim 1, comprising:
selecting an occurrence of connected defective position measurements in response to a sudden change in a desired value as a criterion for failure of an entire measuring system.

* * * * *